US010742933B2

(12) United States Patent
Noguchi et al.

(10) Patent No.: US 10,742,933 B2
(45) Date of Patent: Aug. 11, 2020

(54) IN-VEHICLE PICTURE STORAGE DEVICE FOR MOTORCYCLE

(71) Applicant: HONDA MOTOR CO., LTD., Tokyo (JP)

(72) Inventors: Kohei Noguchi, Wako (JP); Takashi Sasaki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 2 days.

(21) Appl. No.: 15/024,611

(22) PCT Filed: Oct. 4, 2013

(86) PCT No.: PCT/JP2013/077110
§ 371 (c)(1),
(2) Date: Mar. 24, 2016

(87) PCT Pub. No.: WO2015/049792
PCT Pub. Date: Apr. 9, 2015

(65) Prior Publication Data
US 2016/0241816 A1  Aug. 18, 2016

(51) Int. Cl.
H04N 7/18 (2006.01)
B62K 23/02 (2006.01)
(Continued)

(52) U.S. Cl.
CPC .............. H04N 7/181 (2013.01); B62J 11/00 (2013.01); B62K 23/02 (2013.01); G01S 19/24 (2013.01);
(Continued)

(58) Field of Classification Search
CPC ......... H04N 7/181; H04N 5/247; B62J 11/00; B62K 23/02; G01S 19/24; G06K 9/00302; G06K 9/00845
See application file for complete search history.

(56) References Cited

U.S. PATENT DOCUMENTS 4,800,664 A * 1/1989 Marstall ................... B62J 11/00
224/413
2002/0124260 A1* 9/2002 Rivera ...................... B60R 1/00
725/105
(Continued)

FOREIGN PATENT DOCUMENTS

DE  202008012289 U1  12/2008
JP  2003-104170  4/2003
(Continued)

OTHER PUBLICATIONS

Canadian Office Action dated Jan. 26, 2017, Application No. 2,925,865, 3 pages.
(Continued)

Primary Examiner — Christopher G Findley
(74) Attorney, Agent, or Firm — Rankin, Hill & Clark LLP

(57) ABSTRACT

In an in-vehicle picture storage device for a motorcycle having a camera mounted in a vehicle, and a storage device for storing pictures taken by the camera, the camera contains a first camera for imaging rider's facial expression, and the storage device stores vehicle environmental information in association with pictures taken by the first camera. The stored rider's pictures can be viewed in association with the vehicle environmental information, and a user can experience the conditions of a rider, a vehicle, etc. more realistically.

12 Claims, 13 Drawing Sheets

(51) Int. Cl.
  B62J 11/00  (2020.01)
  G01S 19/24  (2010.01)
  G06K 9/00  (2006.01)
  H04N 5/247  (2006.01)
  B62J 45/00  (2020.01)
  B62J 45/20  (2020.01)
  B62J 50/20  (2020.01)
  B62J 50/21  (2020.01)

(52) U.S. Cl.
  CPC ..... *G06K 9/00302* (2013.01); *G06K 9/00845* (2013.01); *H04N 5/247* (2013.01); *B62J 45/00* (2020.02); *B62J 45/20* (2020.02); *B62J 50/20* (2020.02); *B62J 50/225* (2020.02)

(56) References Cited

U.S. PATENT DOCUMENTS

| | | | | |
|---|---|---|---|---|
| 2003/0062986 | A1 | 4/2003 | Sakamoto et al. | |
| 2011/0080043 | A1* | 4/2011 | Waida | B60L 1/003 307/9.1 |
| 2014/0092251 | A1* | 4/2014 | Troxel | G07C 5/0866 348/148 |
| 2015/0124060 | A1* | 5/2015 | Hasegawa | H04N 13/243 348/47 |

FOREIGN PATENT DOCUMENTS

| | | |
|---|---|---|
| JP | 2004-175126 A | 6/2004 |
| JP | 2006-103600 | 4/2006 |
| JP | 2006-172215 A | 6/2006 |
| JP | 2006-280513 | 10/2006 |
| JP | 2010-211613 | 9/2010 |
| JP | 2011-065561 | 3/2011 |

OTHER PUBLICATIONS

European Search Report dated May 31, 2017, 6 pages.
International Search Report, PCT/JP2013/077110 dated Dec. 24, 2013, 2 pages.
Written Opinion of the International Searching Authority, PCT/JP2013/077110 dated Dec. 24, 2013, 4 pages.
International Preliminary Report on Patentability, PCT/JP2013/077110 dated Apr. 14, 2016, 7 pages.
Japanese Office Action dated Dec. 20, 2016 (English translation included).
Canadian Office Action dated Oct. 17, 2017, 3 pages.
Canadian Office Action dated Aug. 3, 2018, 4 pages.
European Office Action dated Jun. 4, 2019, 6 pages.
European Office Action dated Jan. 17, 2019, 6 pages.
Canadian Office Action dated Aug. 28, 2019, 5 pages.

\* cited by examiner

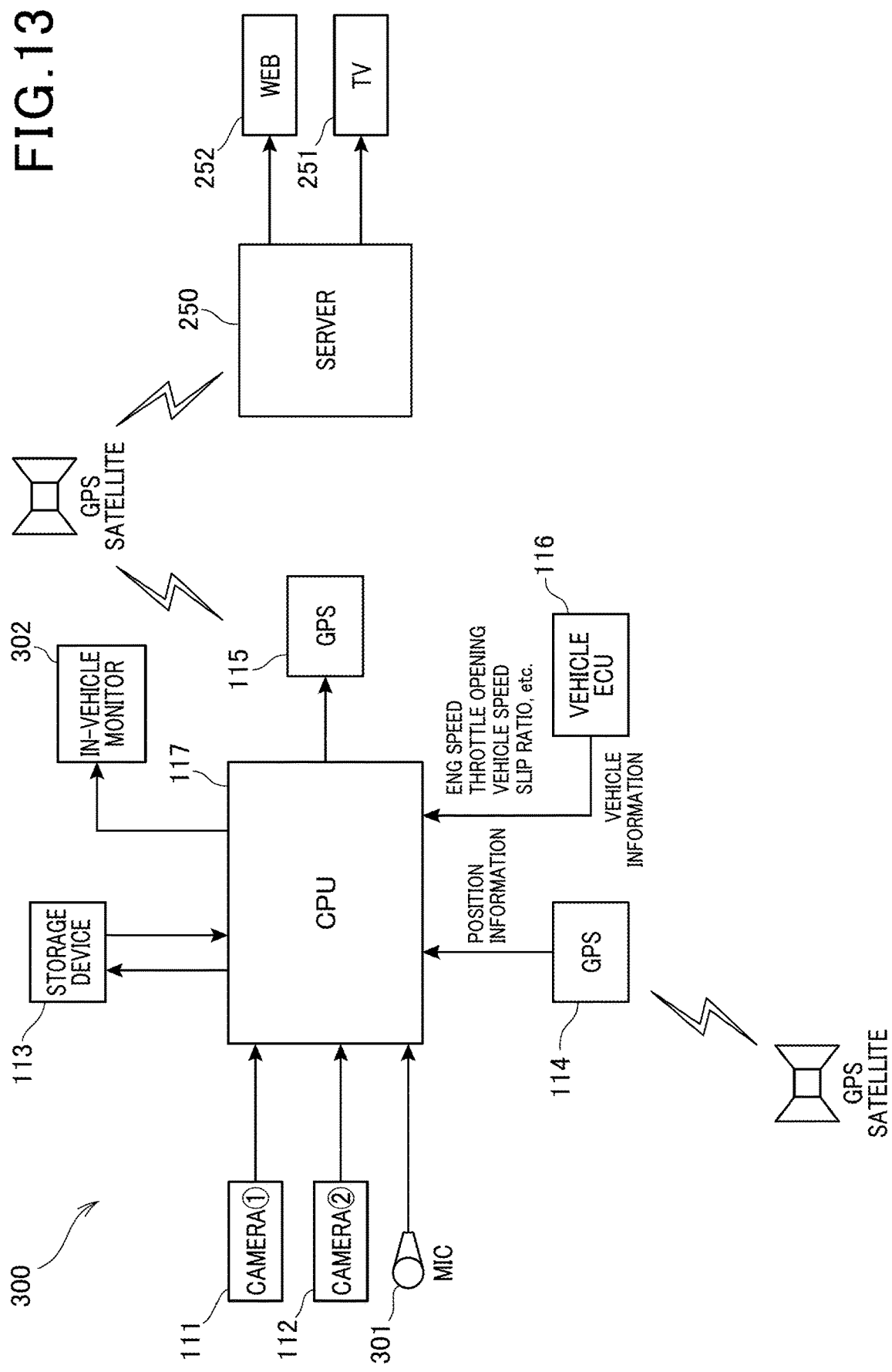

IN-VEHICLE PICTURE STORAGE DEVICE FOR MOTORCYCLE

TECHNICAL FIELD

The present invention relates to an in-vehicle video storage device for a motorcycle that has a camera and a storage device for storing pictures taken by the camera.

BACKGROUND ART

There has been known an in-vehicle camera device that has a camera unit capable of imaging the front side of a vehicle body and a recording unit for recording pictures taken by the camera unit as electronic data, and is mounted in a vehicle so that the camera unit is secured to the front head portion of a cowling with which the vehicle-body front portion of the motorcycle is covered (see Patent Document 1, for example).

The camera unit is detachably mounted to the front head portion of the cowling, and it may be detached from the front head portion of the cowling to take pictures of a rider.

PRIOR ART DOCUMENT

Patent Document

Patent Document 1: JP-A-2004-175126

SUMMARY OF THE INVENTION

Problem to be Solved by the Invention

In the Patent Document 1, images which are taken by the camera unit and recorded in the recording unit can be checked through a liquid crystal monitor. If the condition of a vehicle or a rider can be viewed more realistically, it could deepen an interest in the vehicle or the rider.

The present invention has been implemented in view of the foregoing situation, and has an object to provide an in-vehicle picture storage device for a motorcycle that a user can bodily feel the condition of a vehicle or a rider more realistically.

Means of Solving the Problem

In order to attain the above object, according to the present invention, an in-vehicle picture storage device for a motorcycle comprising a camera (111, 112) mounted in a vehicle, and a storage device (113) for storing pictures taken by the camera (111, 112), is characterized in that the camera (111, 112) contains a first camera (111) for imaging rider's facial expression, and the storage device (113) stores vehicle environmental information in association with pictures taken by the first camera (111).

In the above construction, the vehicle environmental information may be picture information in front of a vehicle.

In the above construction, the vehicle environmental information may be position information from GPS (114).

In the above construction, the vehicle environmental information may be vehicle speed information from ECU (116).

In the above construction, the vehicle environmental information may be vehicle information containing throttle opening, engine speed, etc.

In the above construction, the first camera (111) and/or the second camera (112) may be disposed behind a wind screen (30) that covers a meter group (31) disposed in front of a handle (27) from the front side.

In the above construction, the back surface (30m) of the wind screen (30) may be subjected to an irregular reflection preventing treatment.

In the above construction, the first camera (111) may be provided to be adjustable in angle.

In the above construction, the second camera (112) may be provided to be near to the center in a vehicle width direction of a stay (28, 144) provided to a head pipe (15) and proximate to a headlight (29) for lighting the front side of a vehicle, and the front surface of the second camera (112) is located behind the headlight (29).

In the above construction, the second camera (112) may be fixed to the stay (28, 144) through a vibration absorber (241).

Effect of the Invention

According to the present invention, the camera contains the first camera for imaging the facial expression of a rider, and the storage device stores the vehicle environmental information in association with the pictures of the first camera. Therefore, the pictures of the rider can be viewed while associated with the vehicle environmental information. Accordingly, as compared with a case where only the rider's pictures are viewed, a user can bodily feel the conditions of the rider, the vehicle, etc. more realistically. Therefore, the user's interest in the rider, the vehicle, etc. can be more greatly deepened.

Furthermore, the vehicle environmental information is the picture information in front of the vehicle which are taken by the second camera. Therefore, by storing the motion and facial expression of the rider in association with the picture information in front of the vehicle, the condition of the rider which is associated with the vehicle running region and the vehicle running condition can be grasped from the associated information, whereby the psychology of the rider under running can be guessed.

The vehicle environmental information is the position information from GPS. Therefore, by storing the rider's motion and facial expression in association with the position information of the vehicle, the variation and harsh condition of the natural environments such as the weather, the temperature, etc. which are associated with the vehicle position can be recognized from the associated information.

Furthermore, the vehicle environmental information is the vehicle speed information from ECU. Therefore, the by storing the rider's motion and facial expression in association with the vehicle speed information, the psychological state of the rider which is appropriate to the vehicle speed can be guessed from the associated information.

Furthermore, the vehicle environmental information is the vehicle information such as the throttle opening, the engine speed, etc. Therefore, by storing the rider's motion and facial expression in association with the vehicle information, the rider's psychology under acceleration/deceleration of the vehicle or each engine load or at each engine speed can be guessed from the associated information.

The first camera and/or the second camera is disposed behind the wind screen which covers the meters disposed in front of the handle from the front side. Therefore, the first camera and/or the second camera can be protected from the front side by the wind screen.

The back surface of the wind screen is subjected to the irregular reflection preventing treatment. Therefore, light is not irregularly reflected from the back surface of the wind screen, and thus it can be prevented from being projected onto the pictures of the first camera and the second camera.

The first camera is provided to be adjustable in angle. Therefore, the rider's motion and facial expression can be easily imaged by adjusting the angle (attitude) of the first camera.

Furthermore, the second camera is provided to be near to the center in the vehicle width direction of the stay provided to the head pipe and proximate to the headlight for lighting the front side of the vehicle, and the front surface of the second camera is located behind the headlight. Therefore, the second camera can be disposed to be near to the center in the vehicle width direction so that pictures of the second camera can be made closer to the scenes in front of the vehicle. Still furthermore, by providing the second camera in proximity to the headlight, lighting for the second camera is unnecessary, and the cost can be suppressed. Since the front surface of the second camera is located behind the headlight, the light of the headlight can be prevented from being projected onto the pictures of the second camera.

Furthermore, the second camera is fixed to the stay through the vibration absorber. Therefore, the vibration of the second camera which is caused by the vibration of the vehicle is absorbed by the vibration absorber, whereby pictures can be taken with suppressing camera shake.

BRIEF DESCRIPTION OF THE DRAWINGS

FIG. 13 is a block diagram showing an in-vehicle picture storage device according to a second embodiment of the present invention.

MODE FOR CARRYING OUT THE INVENTION

Embodiments according to the present invention will be described hereunder with reference to the drawings.

First Embodiment

Figure 1:
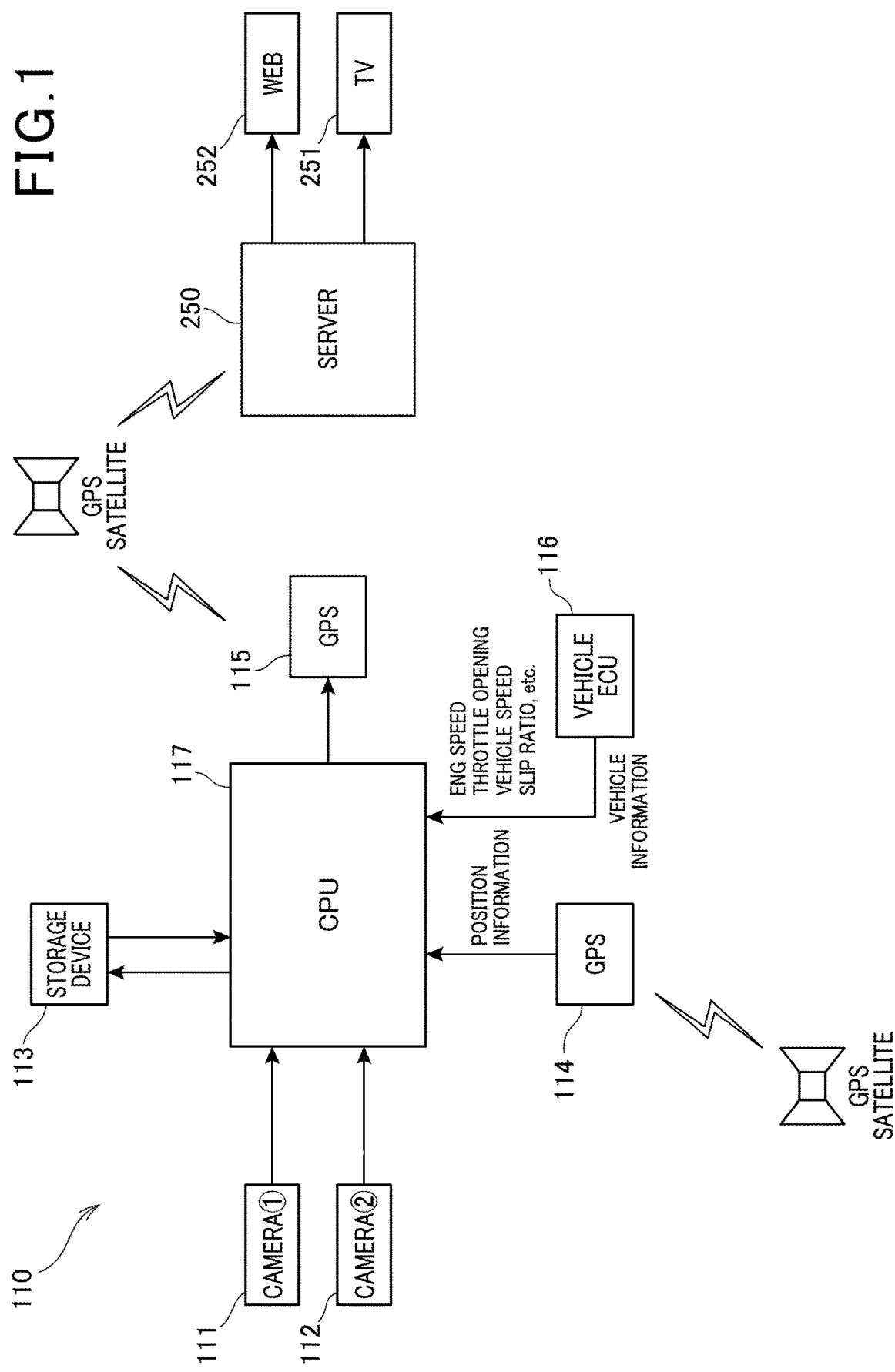
FIG. 1 is a block diagram showing an in-vehicle picture storage device according to a first embodiment of the present invention.

FIG. 1 is a block diagram showing an in-vehicle picture storage device 110 according to a first embodiment.

The in-vehicle picture storage device 110 is mounted in a motorcycle as a vehicle, and it is configured to contain two cameras, a first camera 111 and a second camera 112, a storage device 113, GPS 114, 115, a vehicle ECU 116 and CPU 117, a server 250, TV (Television) 251 and WEB (World Wide Web) 252.

The first camera 111 is a rider camera for imaging a rider as an occupant of the motorcycle, and it images the motion of a rider's upper body, rider's facial expression, etc., for example. The second camera 112 is a front-view camera for imaging scenes in front of the vehicle. The storage device 113 stores pictures taken by the first camera 111 and the second camera 112, environmental information of the vehicle, etc. as electronic data, and a drive device for storing the electronic data into a hard disc drive (HDD), a flash memory such as a flash disc (SSD), a memory card or the like, a digital versatile disc (DVD), a Blu-ray disc or the like is suitably usable as the storage device 113.

GPS 114 is a system for receiving signals from plural GPS satellites and obtaining position information of the motorcycle. GPS 115 is a system for transmitting the picture information, the vehicle environmental information, etc. through the GPS satellites to a server 250 (specifically, a receiver provided to the server 250). The server 250 stores the picture information, the vehicle environmental information, etc. into a storage device thereof, and displays them on TV 251 or distributes them to sites on WEB 252 through distribution servers contained in WEB 252. TV 251 is suitable for domestic use or publicly viewable.

Data transmission from the server 250 to TV 251 and WEB 252 is performed in wired and/or wireless communication style. With respect to GPS 115, GPS 114 may be shared in place of GPS 115.

The vehicle ECU 116 is an engine control unit provided to the motorcycle, and an engine speed (the number of revolutions of the engine), a throttle opening, a vehicle speed, wheel speeds of front and rear wheels, etc. are input to the vehicle ECU 116 as signals from various sensors. CPU 117 is a central processing unit for storing the picture information input from the first camera 111 and the second camera 112, the position information input from GPS 114 and the vehicle information such as the engine speed, the throttle opening, the vehicle speed, a slip ratio described below, etc. in the storage device 113 while the picture information, the position information and the vehicle information are associated with one another. CPU 117 calculates the slip ratio of TCS (traction control system) on the basis of the wheel speeds of the front and rear wheels described above.

Here, the picture information in front of the vehicle which is obtained by the second camera 112, the position information from GPS 114 and the vehicle information from the vehicle ECU 116 are information on an environment under which the vehicle is placed and information of the vehicle itself, and it is called as vehicle environmental information.

Figure 2:
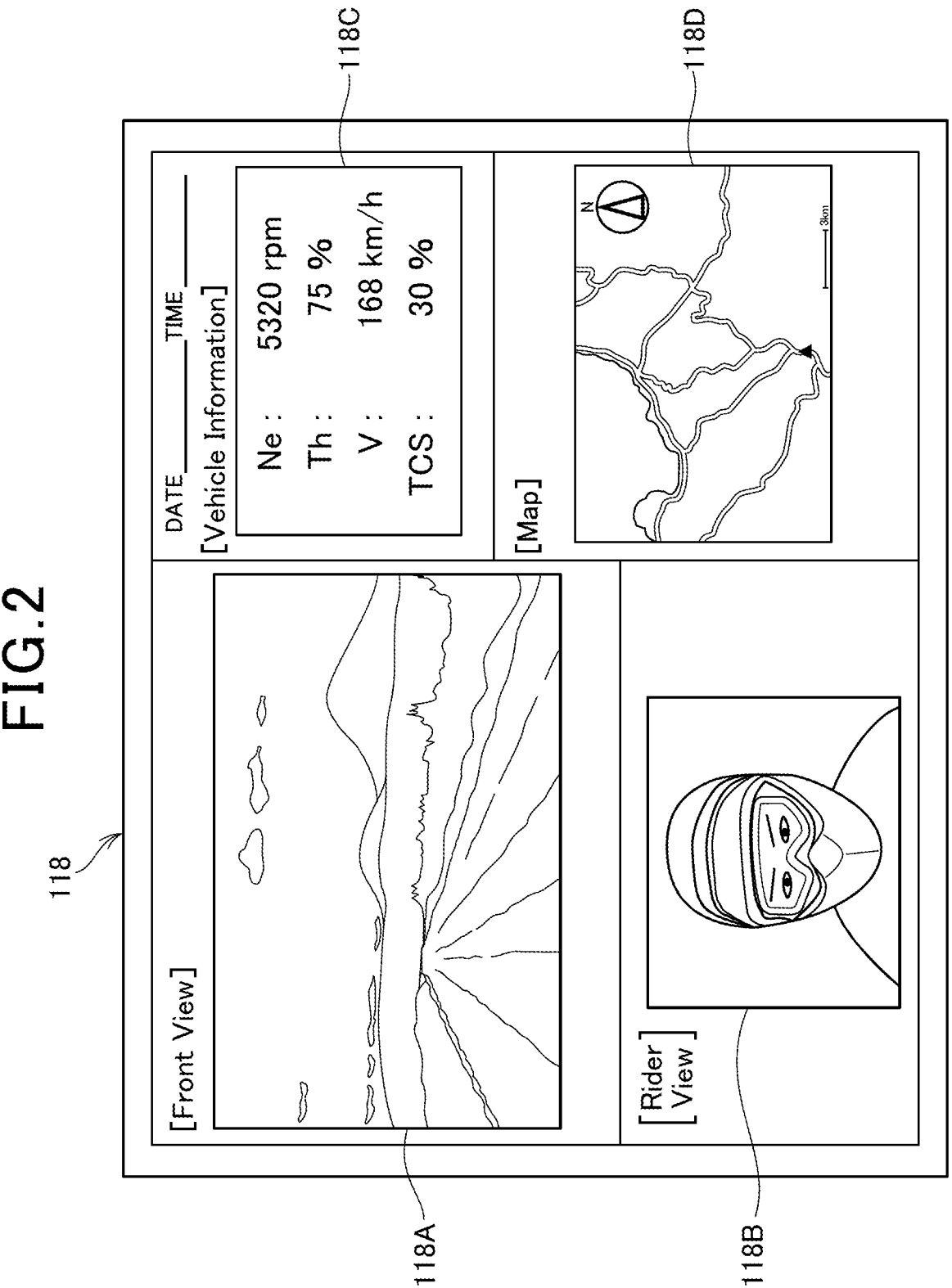
FIG. 2 is a diagram showing a display example in which various kinds of information stored in the in-vehicle picture storage device is displayed on a display.

FIG. 2 is a diagram showing a display example in which various kinds of information stored in the in-vehicle picture storage device are displayed on a display 118.

The various kinds of information (electronic data) stored in the storage device of the in-vehicle picture storage device are displayed and available on the display 118.

The screen of the display 118 is divided into four parts. Pictures in front of the vehicle (Front View 118A) which are taken by the second camera 112 are displayed at the upper left side, a rider's head portion (Rider View 118B) taken by the camera 111 is displayed at the lower left side, the engine speed (Ne), the throttle opening (Th), the vehicle speed (V)

and the slip ratio (TCS) as the vehicle information (Vehicle Information 118C) are displayed at the upper right side while arranged together with the date (DATE) and hour (TIME) at which the pictures of the first camera 111 and the second camera 112 are taken, and a map (Map 118D) is displayed at the lower right side. The direction to North (N) and the present position of the motorcycle (blacked triangle) are displayed on the map.

The Front View 118A, the Rider View 118B and the Vehicle Information 118C and the Map 118D are taken at the same hour on the same date, and they are associated with one another with respect to the time.

As described above, according to this embodiment, the various kinds of information are displayed in association with the time. Therefore, when a condition under which the motorcycle runs is afterwards displayed on the display 118, a user (the rider) can experience the condition concerned more realistically.

When the in-vehicle picture storage device 110 is provided with GPS 115 as shown in FIG. 1, the picture information, the vehicle environmental information, etc. can be transmitted to other servers so that the condition of the motorcycle is individually enjoyed, and further displayed on the publicly viewable TV 251 or uploaded to WEB 252 (WEB site) to make many people enjoy the condition of the motorcycle.

Figure 3:
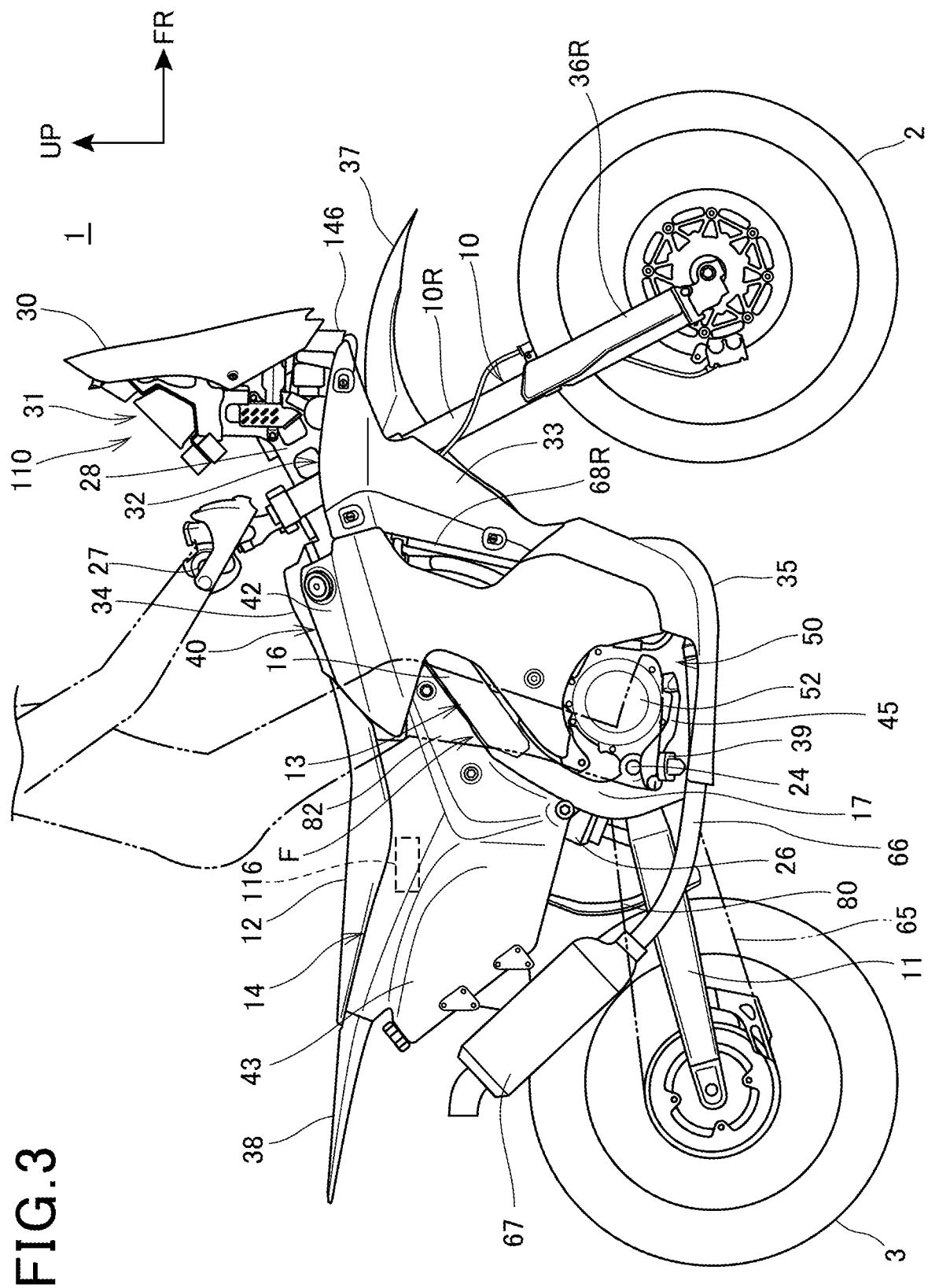
FIG. 3 is a right side view showing a motorcycle in which the in-vehicle picture storage device is mounted.

FIG. 3 is a right side view showing the motorcycle 1 in which the in-vehicle picture storage device 110 is mounted. In the following description, the descriptions on front-and-rear, right-and-left and up-and-down directions are the same as the directions of the vehicle body if not specifically described. Furthermore, character FR represented in the figures represents the forward direction of the vehicle body, character UP represents the upward direction of the vehicle body and character LE represents the leftward direction of the vehicle body.

The motorcycle 1 is a vehicle for rally competition in which an engine 50 as a power unit is supported by a vehicle body frame F, a front fork 10 supporting a front wheel 2 is steerably supported at the front end of the vehicle body frame F and a swing arm 11 supporting a rear wheel 3 is provided to the rear portion of the vehicle body frame F.

Furthermore, the motorcycle 1 is also a saddle-type vehicle in which a seat 12 on which a rider straddles and sits is provided at the upper side of the center portion in the front-and-rear direction of the vehicle body frame F. Furthermore, the motorcycle 1 is an off-road type vehicle suitable for running on an irregular ground such as a sandy place or the like, and it has a large suspension stroke and is provided with a large-size fuel tank 40.

The vehicle body frame F is configured to have a front frame 13 which is formed like a basket by joining pipe members and plate members through welding or the like, and a rear frame 14 which is connected to the rear portion of the front frame 13 and formed of resin.

The front frame 13 has a head pipe 15 (see FIG. 4) provided to the front end, a pair of right and left main frames 16 which extend from the head pipe 15 backwards while sloping obliquely downwards, and a pair of right and left pivot frames 17 extending downwards from the respective rear ends of the main frames 16.

A pivot shaft 24 for supporting the front end portion of the swing arm 11 freely swingably is provided to the lower portion of the pivot frame 17.

A cylindrical rear suspension unit 26 is disposed to be tilted forwards so that the upper end thereof is connected to the upper portion of the front frame 13 and the lower end thereof is connected to the swing arm 11 through a link mechanism (not shown).

The front fork 10 is supported through a steering shaft (not shown) by the head pipe 15 to be freely turnable, and the front wheel 2 is pivotally supported by the lower end of the front fork 10. A steering handle 27 is fixed to the upper end of the front fork 10.

A front stay 28 projecting forwards is fixed to the front portion of the head pipe 15, and a headlight 29, a wind screen 30 and a meter group 31 are supported on the front stay 28.

A fuel tank 40 has a pair of right and left front tanks 41, 42 (only the front tank 42 at the right side in FIG. 3 is illustrated) which are disposed divisionally at the right and left sides of the right and left main frames 16, and a rear tank 43 provided on the rear frame 14.

The seat 12 extends backwards to be continuous with the rear portions of the front tanks 41, 42, and is supported by the upper portion of the rear frame 14.

The motorcycle has a vehicle body cover 32 formed of resin. The vehicle body cover 32 has a pair of right and left shrouds 33 which cover, from both the sides, the upper portion of the front fork 10 and a down frame (not shown) extending substantially downwards from the head pipe 15, a tank cover 34 covering the front tanks 41, 42 from the upper side, an under cover 35 covering the lower portion of the front frame 13 and a crankcase 52 of the engine 50 from the upper side and the lower side, and a pair of right and left fork covers 36L, 36R (only the fork cover 36R at the right side is illustrated) covering the lower portion of the front fork 10.

A front fender 37 covering the front wheel 2 from the upper side is fixed to the front fork 10. A rear fender 38 covering the rear wheel 3 from the upper side is fixed to the rear frame 14 behind the seat 12.

A pair of right and left steps 39 on which the rider puts his/her feet are provided to the lower ends of the right and left pivot frames 17. A shift pedal (not shown) is provided in front of the left-side step 39, and a brake pedal 45 is provided in front of the right-side step 39.

The engine 50 is a water cooling type single-cylinder four-cycle engine, and supported in the basket-shaped front frame 13. A crankshaft (not shown) of the engine 50 is disposed to extend horizontally in the vehicle width direction. The engine 50 has the crankcase 52, and a cylinder portion (not shown) projecting upwards from the upper surface of the front portion of the crankcase 52.

An exhaust pipe 66 of the engine 50 extends frontwards and downwards from the front surface of the cylinder head (not shown) provided to the cylinder portion, and then is drawn to the right side. Furthermore, the exhaust pipe 6 extends backwards along the lower portion of the front frame 13, and is connected to a muffler 67 disposed at the right side of the rear wheel 3. The muffler 67 is supported by the rear frame 14.

A pair of radiators 68L, 68R (only the radiator 68R at the right side is illustrated) in which cooling water of the engine 50 is circulated are provided among the down frame (not shown) constituting the front frame 13 and the right and left shrouds 33.

The front tanks 41, 42 are configured to have such a size that they extend among the right and left shrouds 33 and the rear frame 14, extend downwards from the outsides of the right and left main frames 16 and cover the cylinder portion and the side of the front portion of the crankcase 52.

The rear frame 14 is provided with vehicle ECU 116 as a controller of the motorcycle 1. A mudguard 80 extending downwards to the front side of the rear wheel 3 is secured to the lower portion of the rear frame 14.

Figure 4:
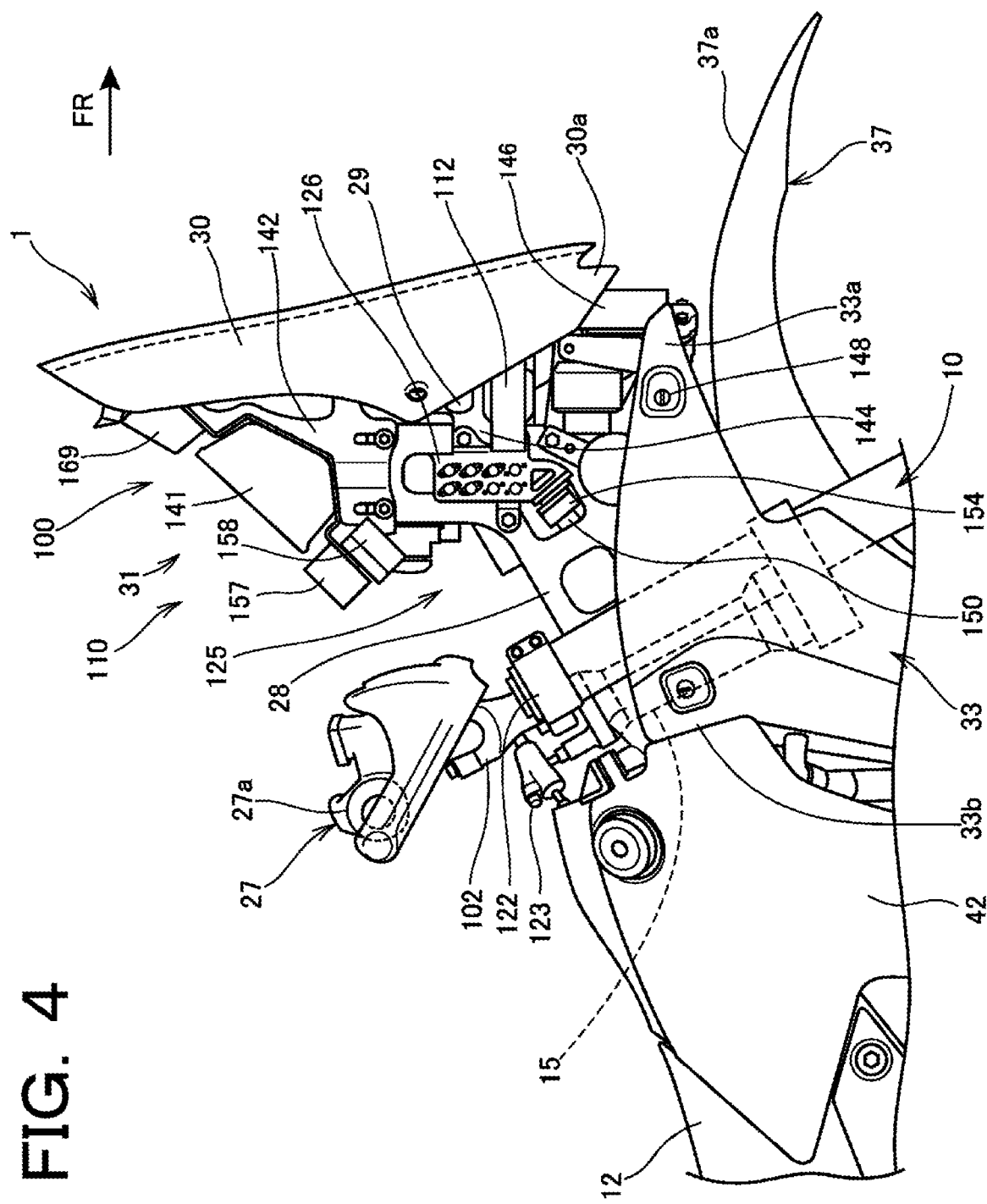
FIG. 4 is a right side view showing the main part of the vehicle body front portion of the motorcycle.

FIG. 4 is a right side view showing the main part of the vehicle body front portion of the motorcycle 1.

The vehicle body front unit 100 in which the headlight 29, the wind screen 30, the meter group 31, other electrical components, etc. are mounted is secured to the head pipe 15.

The vehicle body front unit 100 has a front stay 28 which is freely detachably secured to the front portion of the head pipe 15 with plural screws, and the respective parts are secured to the front stay 28 directly or through plural stays.

The wind screen 30 is transparent, and is located distantly ahead of the handle 27 so as to cover the meter group 31, etc. from the front side. The center portion in the longitudinal direction of the wind screen 30 is located substantially at the same height as grips 27a, 27b (only the grip 27a at the right side is illustrated) of the handle 27 under the state that the front wheel 2 (see FIG. 1) is oriented to face the straight forward direction.

The shroud 33 is configured so that the neighborhood of the tip portion 33a thereof is detachably secured to the lower portion of the vehicle body front unit 100, and the neighborhood of the rear end portion 33b of the upper portion thereof is detachably secured to the front-side tanks 41, 42 (only the front tank 42 at the right side is illustrated) through the stay.

Each of the right and left shrouds 33 is disposed at a lower position than the support member 102 of the handle 27 provided to the upper portion of the front fork 10, and the tip portion 33a of the shroud 33 and the lower end portion 30a of the wind screen 30 are separated from each other in the up-and-down direction.

The support member 102 of the handle 27 is fixed to the upper portion of a top bridge 122 for connecting the right and left sides of the front fork 10. A steering damper 123 for moderating rapid turning of the handle 27 caused by external force is bridged between the top bridge 122 and the front frame 13 (see FIG. 3).

In side view, both the sides of a space 125 surrounded by the wind screen 30 and the shrouds 33 are opened, and a harness connector 126 for electrical components which is secured to the right side portion of the front stay 28 is exposed upwards and sideward. Accordingly, a main harness connecting terminal 154, connection connectors of respective electrical components (not shown), etc. can be easily connected to and disconnected from the harness connector 126. Furthermore, the screws with which the front stay 28 is fixed to the head pipe 15 are loosened, the main harness connecting terminal 154 is detached from the harness connector 12 for electrical components, and harnesses of some electrical components connected to the harness connector 126 for electrical components are detached, whereby the vehicle body front unit 100 can be easily detached from the vehicle body.

Figure 5:
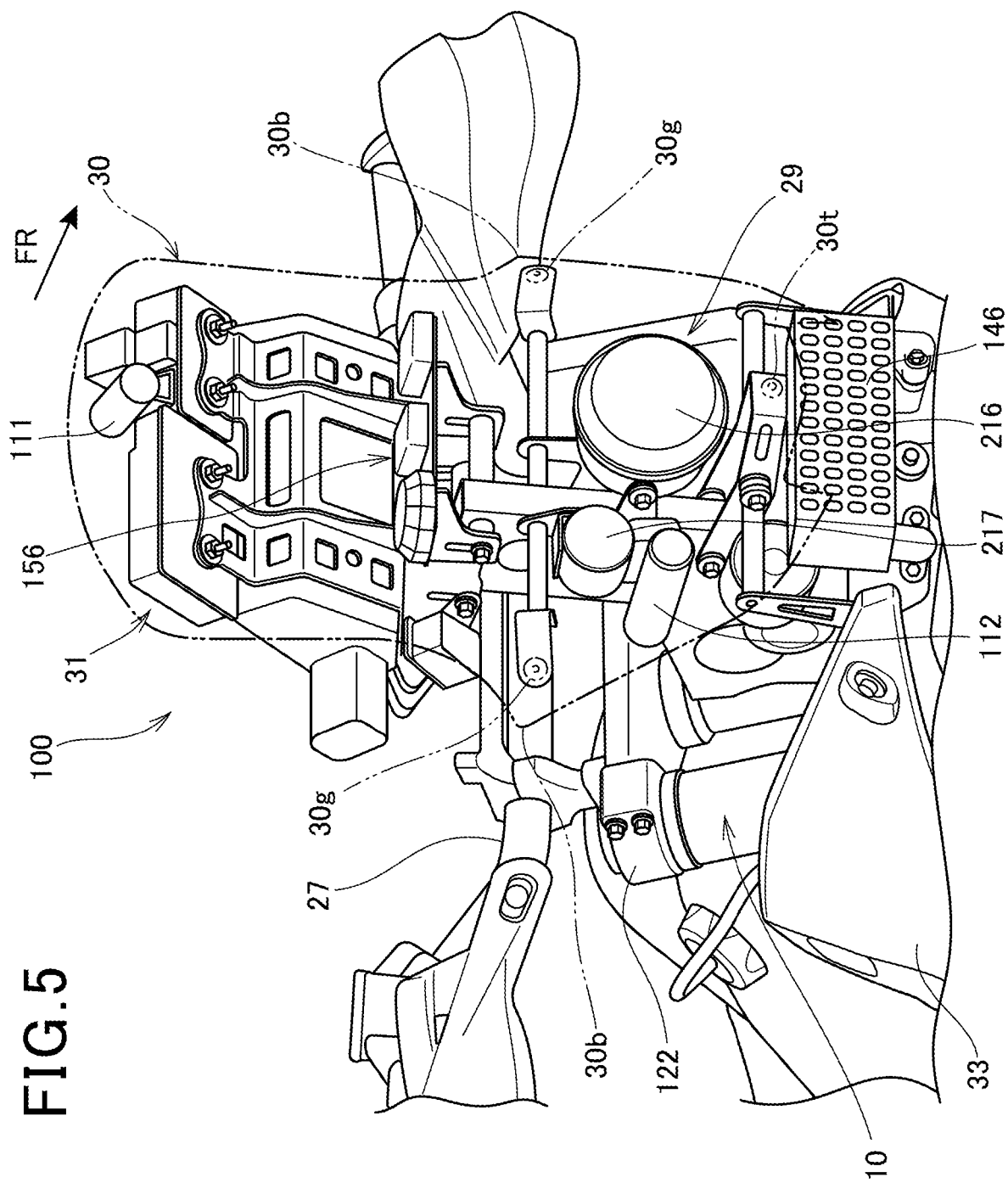
FIG. 5 is a perspective view showing the main part of the vehicle body front portion of the motorcycle.

FIG. 5 is a perspective view showing the main part of the vehicle body front portion of the motorcycle 1.

The front side of the vehicle front unit 100 constructed by the headlight 29, the meter group 31, the first camera 11, the second camera 112, a GPS antenna 156 for reception and transmission, etc. is covered by the transparent wind screen 30.

The headlight 29 comprises a first light 216 containing LEDs as a light source, and a second light 217 containing a bulb as a light source.

The wind screen 30 is designed in a curved shape so that the center in the vehicle width direction thereof is convex forwards, and rear end portions 30b, 30b which project to the most backward position are provided substantially at the center in the height direction.

Furthermore, the wind screen 30 is also designed in an vertically long arcuate shape so that the upper edge thereof is convex upwards. The lower portion of the wind screen 30 has a vertically long portion which gradually narrows to the lower portion thereof, and integrally extends sideward from the lower portion of the vertically long portion.

Fixing portions 30f, 30g, 30g for fixing the wind screen 30 to the parts constituting the vehicle body front unit 100 are provided to the lower portion at the center in the vehicle width direction of the vertically long portion and in the neighborhood of the rear end portions 30b, 30b.

The first camera 111 is disposed above the meter group 31. The second camera 112 is disposed to be adjacent to the headlight 29. The GPS antenna 156 for reception and transmission constitutes a part of GPS 114 (see FIG. 1), and disposed below the first camera 111 and above the headlight 29 and the second camera 112.

Figure 6:
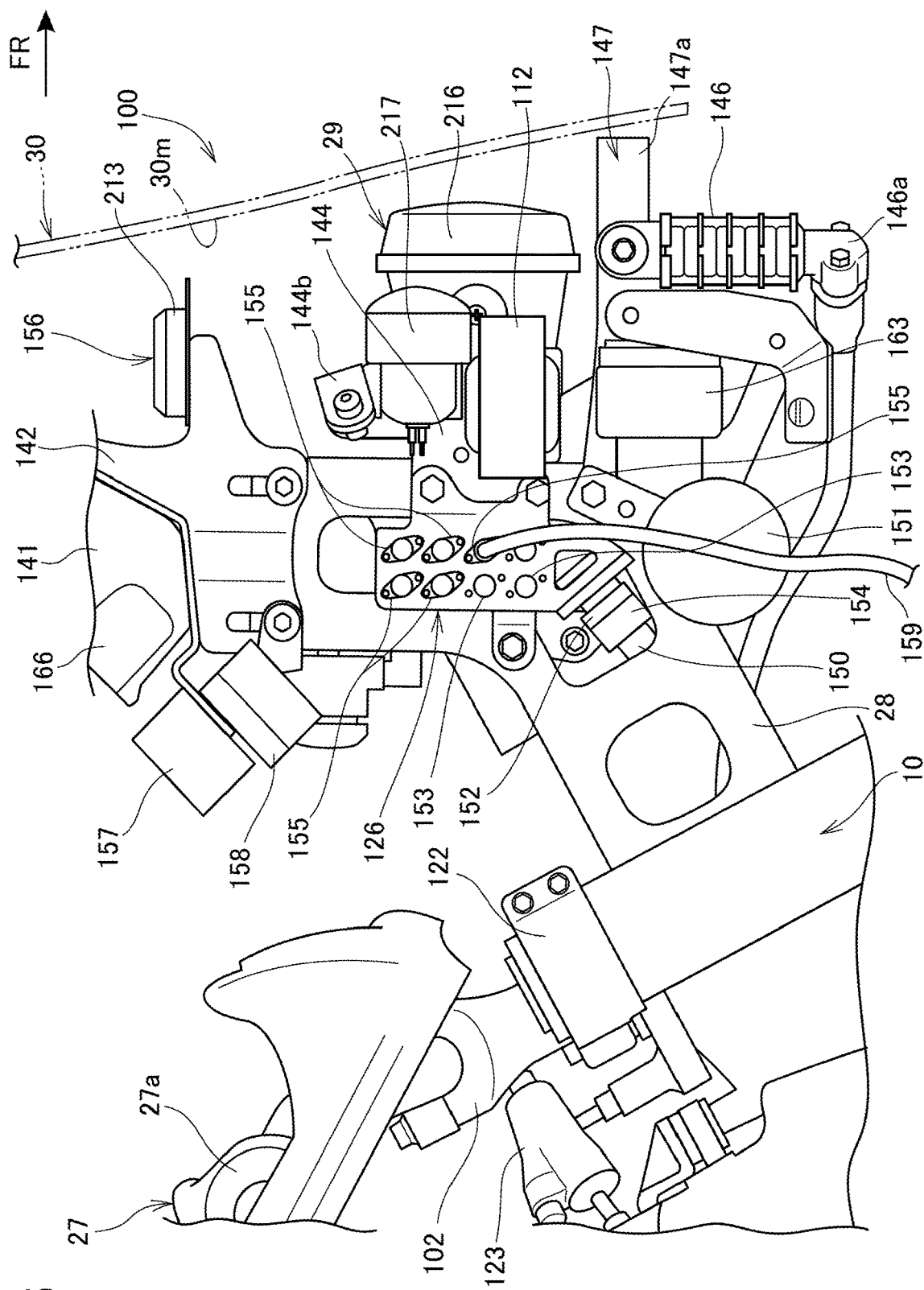
FIG. 6 is a right side view showing the main part of a vehicle body front unit.

FIG. 6 is a right side view showing the main part of the vehicle body front unit 100.

To the front stay 28 are secured a road book holder stay 142 for supporting a road book holder 141, a headlight stay 144 for supporting the headlight 29, and an oil cooler stay 147 for supporting an oil cooler 146.

The road book holder 141 is a device that holds a road book comprising plural maps describing the distance from a start point, etc. in a rally competition, and is capable of performing page ejection by take-up.

The harness connector 126 for electrical components and a horn 151 are directly secured to the side surface of the front stay 28. The harness connector 126 for electrical components is provided with a main harness receiving connector 152 and plural electrical-component receiving connectors 153. The main harness receiving connector 152 is provided to the lower end surface of the harness connector 126 for electrical components, and a main harness connection terminal 154 provided to the end portion of a main harness 150 is connected to the main harness receiving connector 152. The plural electrical-component receiving connectors 153 are provided to the side surface of the harness connector 126 for electrical components.

A connection terminal 155 provided to the end portions of harnesses 159 (only one harness 159 is illustrated) extending from the road book holder 141, the headlight 29, the horn 151, a fuse box 158, a dimmer switch 171 (see FIG. 7), a vehicle speed sensor for the front wheel, etc. are connected as the electrical components disposed in the vehicle body front unit 100 to the plural electrical-component receiving connectors 153.

The GPS antenna 156 for reception and transmission, an auxiliary trip meter 157 and the fuse box 158 are secured to the road book holder stay 142. The auxiliary trip meter 157 is used subsidiarily for a main trip meter described later in detail or when the main trip meter 167 is not operable, and it can display the vehicle speed.

The second camera 112 for imaging the front side of the vehicle body of the running vehicle and the wind screen 30 are secured to the headlight stay 144. The back surface 30m of the wind screen 30 is subjected to an irregular reflection preventing treatment for preventing light, particularly light of the headlight 29 from being irregularly reflected from the back surface 30m and projected into pictures of the second camera 112. Coating of irregular reflection preventing paint or attachment of irregular reflection preventing film may be performed as the irregular reflection preventing treatment.

A buzzer 163 and the wind screen 30 are secured to the oil cooler stay 147. The buzzer 163 is a regulation part delivered from an organizer of the competition, and it is operated to ring by the organizer.

Figure 7:
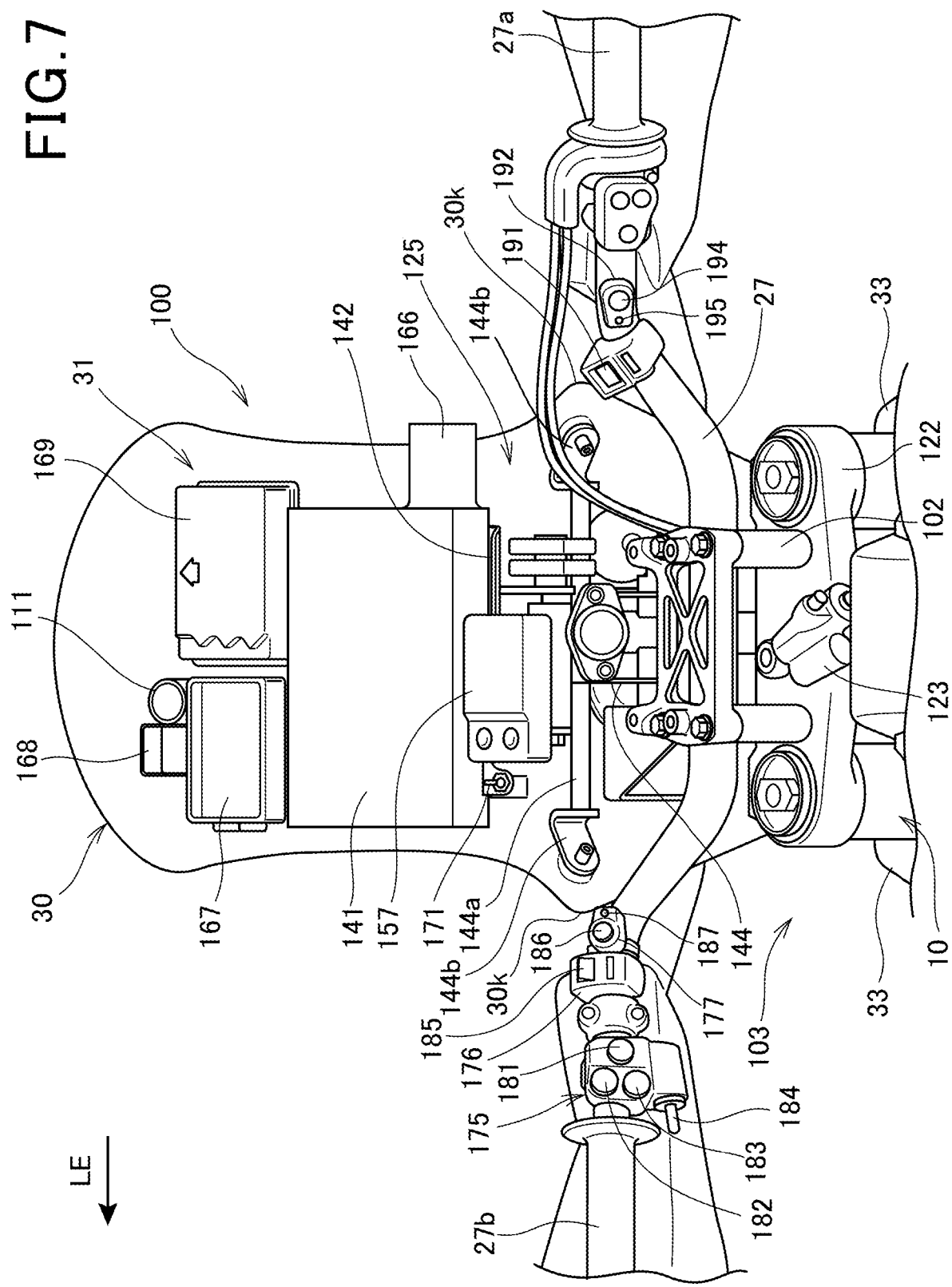
FIG. 7 is a back view of the main part of the vehicle body front portion of the motorcycle.

FIG. 7 is a back view showing the main part of the front portion of the vehicle body of the motorcycle.

The road book holder 141 has an actuator 166 for taking up the road book. The main trip meter 167 is disposed at the upper left side of the road book holder 141. Furthermore, an information meter 168 for displaying the residual amount of fuel and the mode of TCS is disposed at the upper side of the main trip meter 167. An electronic compass 169 is disposed at the upper right side of the load book holder 141. The electronic compass displays the vehicle speed, the azimuth direction (travel direction) and the distance from the start point of the motorcycle which are obtained by the GPS antenna 156 for reception and transmission (see FIG. 6).

The main trip meter 167, the information meter 168, the electronic compass 169 and the auxiliary trip meter 157 are contained in the meter group 31.

The first camera 111 is disposed on the upper surface of the main trip meter 167 and at the side of the information meter 168.

A dimmer switch 171 for switching the headlight 29 between a high-beam mode and a low-beam mode (see FIG. 6) is secured to the left lower end portion of the road book holder stay 142.

The headlight stay 144 has a screen support unit 144a extending in the vehicle width direction, and the right and left fixing portions 30g, 30g (see FIG. 5) of the wind screen 30 are secured to the screen fixing portions 144b, 144b provided to both the ends of the screen support unit 144a by screws.

A multi-operation switch 175 for the road book holder 141 and the main trip meter 167, an engine operating switch 176 and a horn switch 177 for the horn 151 (see FIG. 6) are secured to the handle 27 in the neighborhood of the let-side grip 27b.

The multi-operation switch 175 has a mode switching button 181 for the main trip meter 167, error adjusting buttons 182, 183 for the main trip meter 167, and an actuator operating switch 184 for operating the actuator 166 of the road book holder 141 to take up the road book. The mode switch button 181 is a button for switching the display mode among the running distance, the vehicle speed and the clock. The error adjusting buttons 182, 183 advance or turn back the distance displayed on the main trip meter 167 to adjust the error between the distance indicated on a road map and the distance of the main trip meter 167.

The engine operating switch 176 has a map switching button 185 for switching a control map stored in a memory of ECU 78 (see FIG. 3) to control the engine. The horn switch 177 has a headlight indicator 187 which is provided in the neighborhood of the horn button 186 and turned out when the headlight 29 is set to the high beam.

A main switch 191 and a starter switch are secured to the handle 27 in the neighborhood of the right-side grip 27a. The starter switch 192 has a starter button 194, and an FI indicator 195 which lights to notify abnormality of a fuel injection system of the engine and reduction of a battery voltage.

Figure 8:
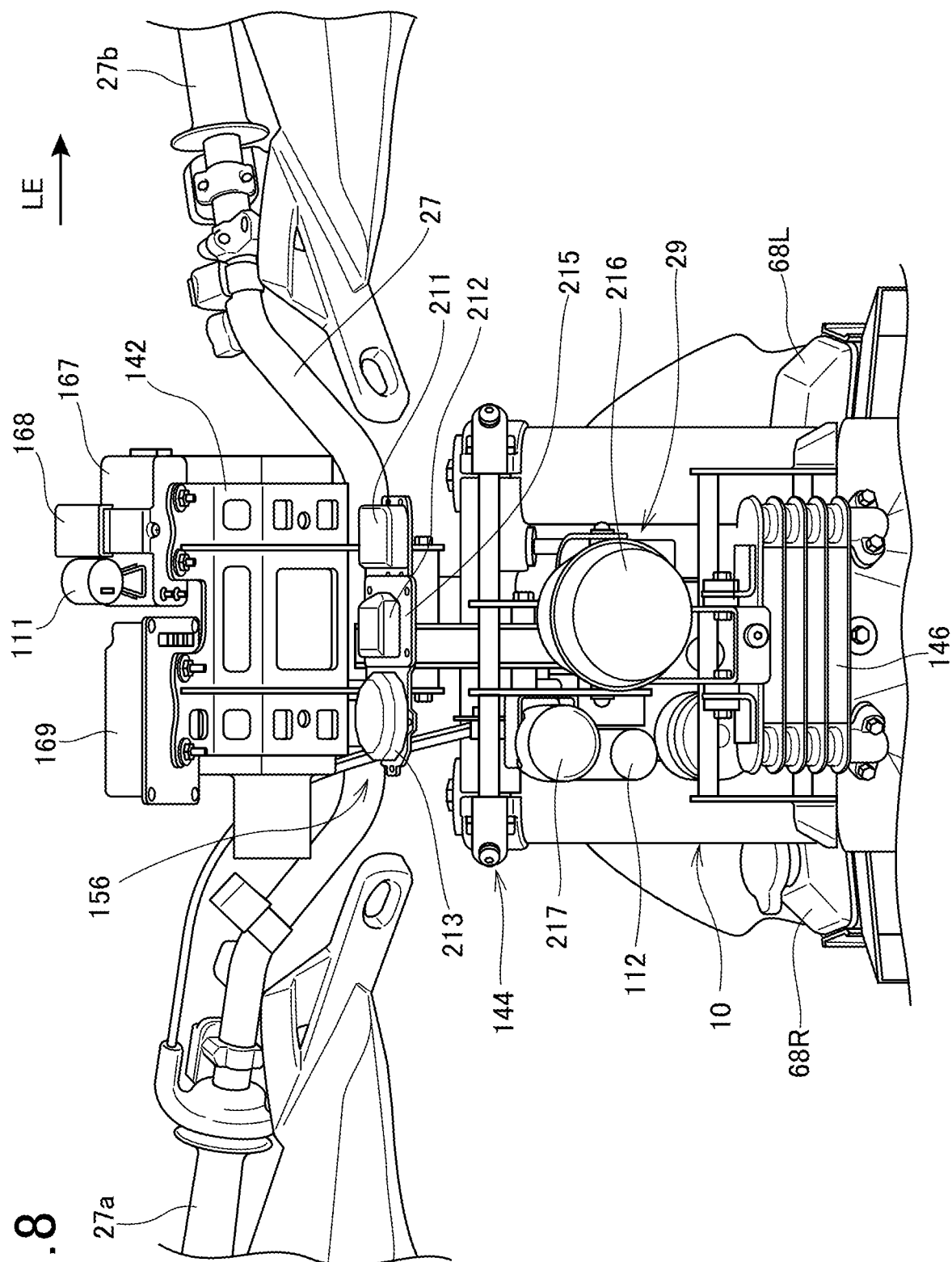
FIG. 8 is a front view showing the main part of the motorcycle under the state that a wind screen is detached.

FIG. 8 is a front view showing the main part of the motorcycle 1 under the state that the wind screen is detached.

The GPS antenna 156 for reception and transmission comprises plural antenna bodies 211, 212, 213, and these antennas bodies are secured and arranged in the vehicle width direction on a seat portion 215 which is provided to the road book holder stay 142 so as to project forwards. The antenna body 211 is exclusively used for transmission, the antenna body 212 is exclusively used for reception, and the antenna body 213 is used for both reception and transmission.

A first light 216 constituting the headlight 29 is disposed substantially at the center in the vehicle width direction, a second light 217 is disposed at the upper right side of the first light 216 and the second camera 112 is disposed below the second light 217. When the headlight 29 is set to the low beam, only the first light 216 is turned on. When the headlight 29 is set to the high beam, both the first light 216 and the second light 217 are turned on.

Figure 9:
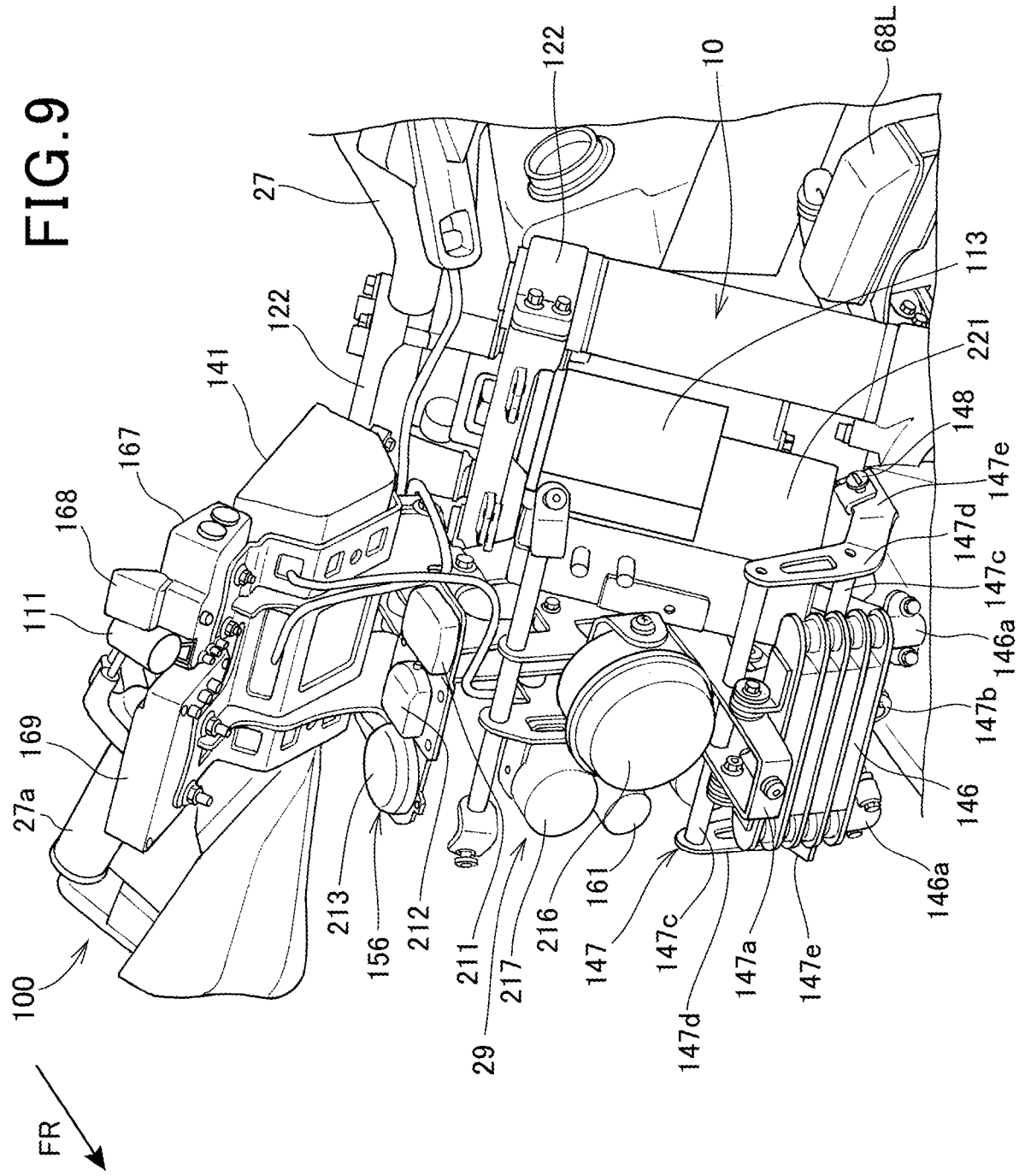
FIG. 9 is a perspective view showing the main part of the front portion of the motorcycle under the state that the wind screen is detached.

FIG. 9 is a perspective view showing the main part of the front portion of the motorcycle 1 under the state that the wind screen is detached.

The oil cooler stay 147 has a pair of upper and lower forward projecting portions 147a and 147b, cross portions 147c, 147c and end portion connecting portions 147d, 147d.

The forward projecting portions 147a, 147b project forward, and the cross portions 147c, 147c extend from the intermediate portions of the forward projecting portions 147a, 147b in the vehicle width direction. The end portion connecting portions 147d, 147d connect both the end portions of the cross portions 147c, 147c, and have a pair of right and left shroud fixing portions 147e, 147e to which the tip portions 33a of the shrouds 33 (see FIG. 4) are fixed. Reference numeral 148 represents a screw for fastening the tip portion of the shroud 33 to the shroud fixing portion 147e. The oil cooler 147 is secured to the forward projecting portions 147a, 147b. Reference numerals 146a, 146a represent hose fixing ports for supplying and exhausting oil in the oil cooler 146.

For example, a regulation part (a distress beacon emitting device) 221 delivered from the organizer of the competition is disposed behind the first light 216 of the headlight 29 and the oil cooler 146. A storage device 113 containing CPU 117 (see FIG. 1) is secured to a side surface of the regulation part 221.

Figure 10:
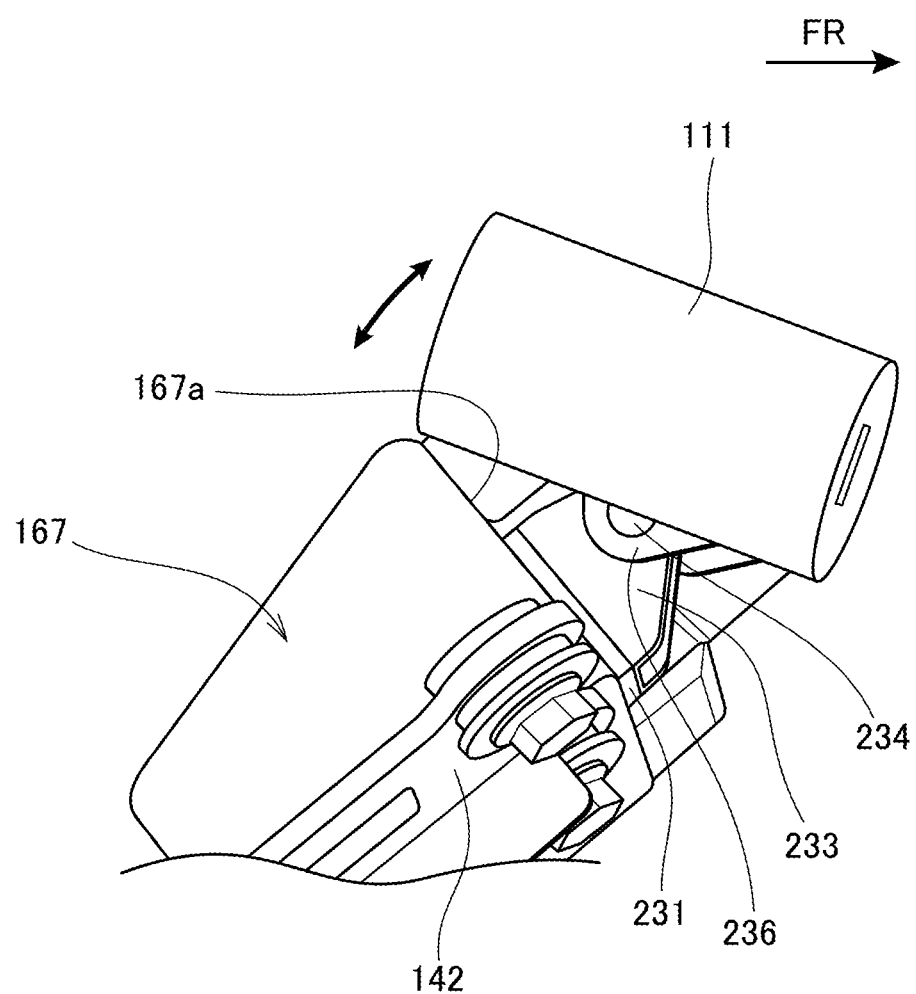
FIG. 10 is aside view showing amounting state of a first camera.

FIG. 10 is a side view showing the mount state of the first camera 111. In FIG. 10, the electronic compass (see FIG. 9) is detached from the road book holder stay 142.

A seat-like vibration absorber 231 is attached to the upper surface 167a of the main trip meter 167, a camera bracket 233 having a substantially U-shaped cross-section is attached to the upper surface of the vibration absorber 231, and the first camera 111 is secured to the camera bracket 23 through a bolt-like support shaft 234 so as to be swingable in the up-and-down direction. Reference numeral 236 represents a camera mount piece which is secured to the lower portion of the first camera 111 and is supported through the support shaft 234.

The first camera 111 is adjusted in angle to be tilted forwards and upwards so that the rider, particularly, the rider's upper half body or face can be imaged by the first camera 111. The angle adjustment is performed by loosening the support shaft 234 relatively to the nut provided to the camera mount piece 236 and swinging the first camera 111 in the up-and-down direction (specifically, in the direction of an arrow in FIG. 10). After the angle adjustment, the support shaft 234 is fastened to fix the angle of the first camera 111.

As shown in FIGS. 7 and 10, the first camera 111 is disposed on the upper portion of the main trip meter 167 which is required to be checked at all times under running of the vehicle, and also disposed in the neighborhood of the information meter 168 and the electronic compass 169 which are likewise required to be checked at all times, so that rider's facial expression and motion can be excellently imaged by the first camera 111 without paying rider's attention to the first camera 111 when the rider directs his/her face or eye line to the respective kinds of meters.

Figure 11:
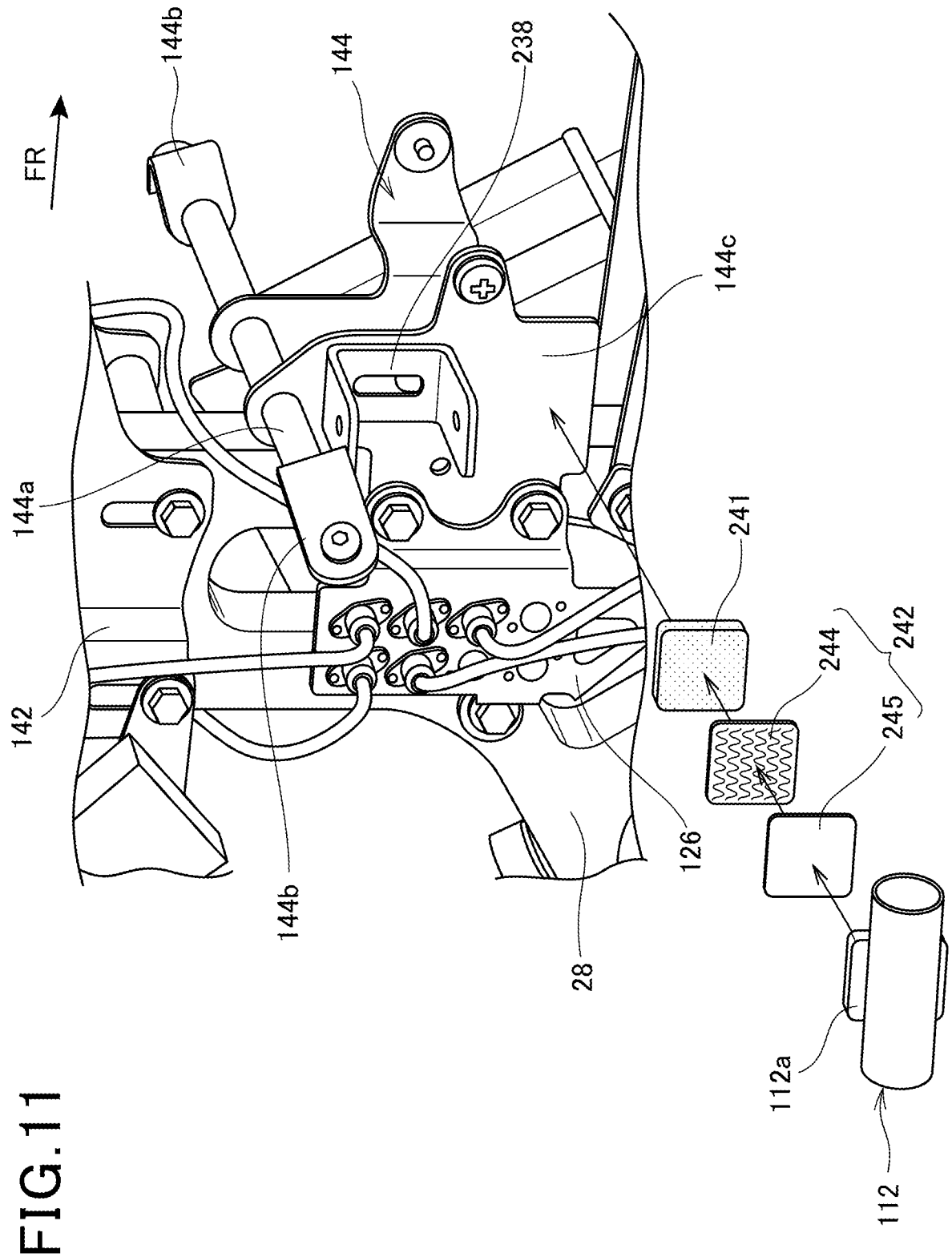
FIG. 11 is a perspective view showing a mount position of a second camera.

FIG. 11 is a perspective view showing the mount position of the second camera 112.

A light bracket 238 having a substantially U-shaped cross-section for supporting the second light 217 (see FIG. 9) is secured to the upper portion of the right side surface 144c of the headlight stay 144 so as to be located below the screen support portion 144a extending in the right-and-left direction.

A vibration absorber 241 is secured to the right side surface 144c so as to be located below the light bracket 238, and the second camera 112 is freely detachably secured to the vibration absorber 241 through a hook-and-loop fastener (touch fastener) 242.

The vibration absorber 241 is of a low repulsion type having a high vibration/impact absorbing property, and it prevents vibration or impact occurring in the vehicle body from being transmitted to the second camera 112, whereby camera shake can be suppressed and high-quality camera pictures can be obtained.

The hook-and-loop fastener 242 comprises a coupled portion 244 attached to the vibration absorber 241, and a coupling portion 245 which is attached to the base portion 112a of the second camera 112 so as to be detachably coupled to the coupled portion 244. For example, the hook-and-loop fastener 242 comprises an endless number of coupled pieces and an endless number of coupling pieces to be coupled to the coupled pieces as if an endless number of hooks and an endless number of loops are coupled to one another, one of the coupled piece group and the coupling piece group is provided to the coupled portion 244, and the other group is provided to the coupling portion 245.

Figure 12:
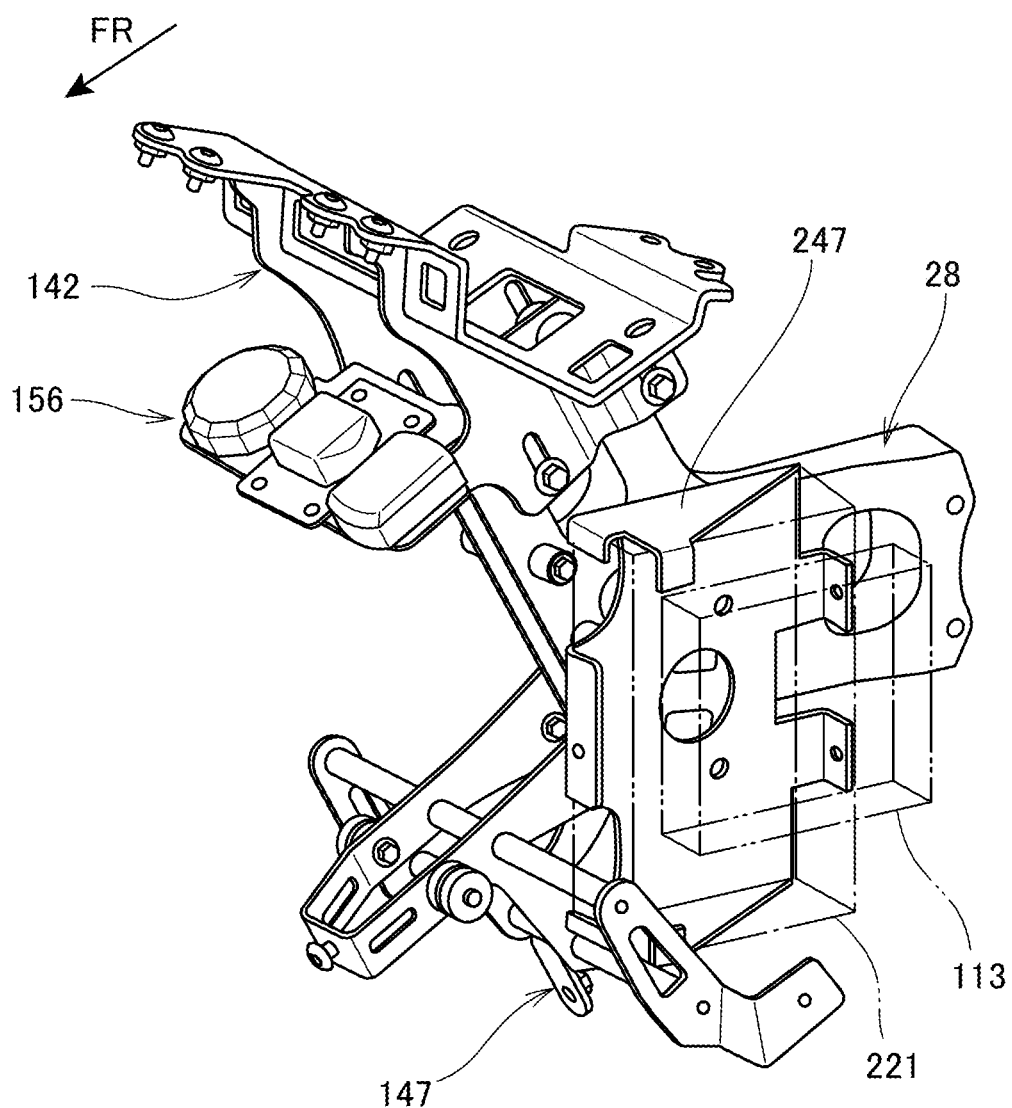
FIG. 12 is a perspective view showing a regulation part and a support portion of a storage device.

FIG. 12 is a perspective view showing a support portion for the regulation part 221 and the storage device 113.

A side bracket 247 is secured to the left side of the oil cooler stay 147, the regulation part 221 is secured to the side bracket 247, and the storage device 113 is secured to the side surface of the regulation part 221. The regulation part 221 is disposed so as to occupy a large space at the left side of the front stay 28 and the oil cooler stay 147 of the vehicle front unit 100 (see FIG. 4). A large-size side bracket 247 is used to support the storage device 113 and the large-size regulation part 221.

Since the storage device 113 is secured to the regulation part 221, another wire can be easily branched from various signal wires to be connected to the regulation part 221 to the storage device 113 to receive signals, so that the wires can be shortened and the wiring work can be efficiently performed.

As shown in FIGS. 1 and 2, in the in-vehicle picture storage device 110 for the motorcycle having the camera (the first camera 111 and the second camera 112) mounted in the vehicle body and the storage device 113 for storing pictures taken by the camera (the first camera 111 and the second camera 112), the camera contains the first camera 111 for imaging the rider's facial expression, and the storage device 113 stores the vehicle environmental information in association with the pictures of the first camera 111.

According to this construction, since the camera contains the first camera 111 for imaging the rider's facial expression, and the storage device 113 stores the vehicle environmental information in association with the pictures of the first camera 111, the rider's motion and facial expression are imaged by the first camera 111, and the pickup pictures are stored in association with the vehicle environmental information, so that the rider's pictures can be viewed in association with the vehicle environmental information. Accordingly, a user can experience (bodily feel) the conditions of the rider, the vehicle, etc. more realistically as compared with a case where only the pictures of the rider are merely viewed. Therefore, the interest in the rider, the vehicle, etc. (the vehicle body itself, and environments such as scenes and geography of a region where the vehicle runs, animals and plants living in the region, etc.) can be more deepened.

Furthermore, the vehicle environmental information contains the picture information in front of the vehicle which is taken by the second camera 112. Therefore, by storing the rider's motion and facial expression in association with the picture information in front of the vehicle, the vehicle running region and the rider's state corresponding to the vehicle running state can be grasped on the basis of the associated information. Accordingly, for example, rider's psychology under vehicle running can be guessed.

Furthermore, the vehicle environmental information contains the position information from GPS 114. Therefore, by storing the rider's motion and facial expression in association with the position information of the vehicle, variation and harsh condition of the natural environment such as weather, temperature, etc. which correspond to the vehicle position, for example, can be recognized from the associated information.

Furthermore, the vehicle environmental information contains the vehicle speed information from ECU 116. Therefore, by storing the rider's motion and facial expression in association with the vehicle speed information, the rider's psychological state appropriate to the vehicle speed, for example, can be guessed from the associated information.

Still furthermore, the vehicle environmental information contains the vehicle information such as the throttle opening th, the engine speed Ne, the slip ratio of TCS, etc. Therefore, by storing the rider's motion and facial expression in association with the vehicle information, the rider's psychology under acceleration/deceleration of the vehicle or each engine load or at each engine speed, for example, can be guessed from the associated information.

As shown in FIG. 5, the first camera 111 and/or the second camera 112 are/is disposed behind the wind screen 30 which covers the meter group 31 as measuring gauges disposed in front of the handle 27. Therefore, the first camera 111 and/or the second camera 112 can be protected from the front side by the wind screen 30.

As shown in FIG. 6, the back surface 30m of the wind screen 30 is subjected to the irregular reflection preventing treatment. Therefore, light is not irregularly reflected from the back surface 30m of the wind screen 30, and thus it can be prevented from being projected into pictures of the first camera 111 and the second camera 112.

As shown in FIG. 10, the first camera 111 is provided so that the angle thereof can be adjusted, so that the rider's motion and facial expression can be made to be easily imaged by adjusting the angle of the first camera 111.

As shown in FIGS. 4, 6 and 8, the second camera 112 is provided in proximity to the front stay 28 as a stay provided to the head pipe 15 and the headlight 29 which is near to the center in the vehicle width direction of the headlight stay 144 and lights the front side of the vehicle, and the front surface of the second camera 112 is located behind the headlight 29, so that the second camera 112 can be disposed to be near to the center in the vehicle width direction and pictures of the second camera 112 can be made closer to scenes in front of the vehicle which are viewed by the rider. Furthermore, by providing the second camera 112 in proximity to the headlight 29, lighting for the second camera 112 is unnecessary, and thus the cost can be suppressed. Since the front surface of the second camera 112 is located behind the headlight 29, the light of the headlight 29 can be prevented from being projected into the pictures of the second camera 112.

As shown in FIG. 11, the second camera 112 is fixed to the front stay 28 and the headlight stay 144, specifically, to the right side surface 144c of the headlight stay 144 through the vibration absorber 241. Therefore, vibration of the second camera 112 which follows vibration of the vehicle body can be absorbed by the vibration absorber 241, so that pictures can be taken while suppressing camera shake.

Second Embodiment

FIG. 13 is a block diagram showing an in-vehicle picture storage device 300 according to a second embodiment of the present invention. The same constituent elements as the first embodiment are represented by the same reference numerals, and the detailed description thereof is omitted.

The in-vehicle picture storage device 300 is mounted in a motorcycle as a vehicle. In the in-vehicle picture storage device 300, a microphone 301 and an in-vehicle monitor 302 are added to the in-vehicle picture storage device 110 of the first embodiment shown in FIG. 1.

The microphone 301 converts surrounding sounds and rider's voices under running or stop of the motorcycle to electrical signals. The electrical signals are stored in the storage device 113 by CPU 117 while associated with the picture information from the first camera 111 and the second camera 112, the position information from GPS 114 and the vehicle information from the vehicle ECU 116.

The in-vehicle monitor 302 is capable of displaying pictures being taken by the first camera 111 and the second camera 112 or pictures stored in the storage device 113. The pictures taken by both the first camera 111 and the second camera 112 can be displayed at the same time or only the pictures taken by one of these cameras may be displayed on the in-vehicle monitor 302.

The sound/voice information obtained by the microphone 301 is one of the vehicle environmental information.

The embodiments described above are examples of the present invention, and any modification and application may be made without departing from the subject matter of the present invention.

For example, in the above embodiments, the first camera 111 is secured to the upper surface of the main trip meter 167 as shown in FIG. 7. However, the present invention is not limited to this style, and the first camera 111 may be secured to the upper surface of the electronic compass 169.

Furthermore, as shown in FIG. 10, the first camera 111 is secured to the upper surface of the main trip meter 167 through the vibration absorber 231. However, the present invention is not limited to this style, and the first camera 111 may be detachably secured through a hook-and-loop faster 242 as shown in FIG. 11 to the vibration absorber 231 which is secured to the upper surface of the main trip meter 167.

Still furthermore, as shown in FIGS. 1 and 5, the two cameras of the first camera 111 and the second camera 112 are provided to the in-vehicle picture storage device 110. However, the present invention is not limited to this style, and a camera (s) for taking scenes around the vehicle such as scenes of the side (s) of the vehicle, the back side of the vehicle or the like may be provided in addition to the above two cameras.

DESCRIPTION OF REFERENCE NUMERALS 1 motorcycle
15 head pipe
27 handle
28 front stay (stay)
29 headlight
30 wind screen
30m back surface
31 meter group (measuring gauge)
110 in-vehicle picture storage device
111 first camera
112 second camera
113 storage device
114 GPS
116 vehicle ECU (ECU)
144 headlight stay (stay)
241 vibration absorber

The invention claimed is:

1. An in-vehicle video storage device and display device for a motorcycle having a road book holder that holds a road book and a main trip meter that is disposed at an upper side of the road book holder, that displays distance of the motorcycle and that is checked by a rider while the motorcycle is running, comprising
   a camera mounted in a vehicle, and
   a storage device and a display device that stores and displays a video taken by the camera,
   wherein the camera contains a first camera for imaging rider's facial expression and a second camera imaging scenes in front of the motorcycle,
   wherein the first camera is secured to a camera bracket that is attached to an upper surface of a vibration absorber that is attached to an upper surface of the main trip meter, secured to the camera bracket through a support shaft so as to be swingable in an up-and-down direction, and disposed at a position in which the first camera images a rider's face, from right in front, including a movement of the rider's eye line so that the rider's eyes are displayed at a center of a video taken by the first camera,
   the storage device reproducibly stores the video taken by the first camera and vehicle environmental information comprising at least a video taken by the second camera, a map including a direction to North and a present position of the motorcycle from a global positioning system (GPS), and vehicle information containing throttle opening, engine speed and vehicle speed from an engine control unit (ECU), in association with the date and the time, the at least the video taken by the first camera, the video taken by the second camera, the map, and the vehicle information which are stored in the storage device are taken at the same hour on the same date, and the display device displays the pictures of the first camera and the vehicle environmental information associated with the video of the first camera.

2. The in-vehicle video storage device and display device for the motorcycle according to claim 1, wherein the first camera is disposed adjacent an information meter and an electronic compass which are checked while the vehicle is running.

3. The in-vehicle video storage device and display device for the motorcycle according to claim 1, wherein a back surface of a wind screen is subjected to an irregular reflection preventing treatment.

4. The in-vehicle video storage device and display device for the motorcycle according to claim 1, wherein the first camera is provided to be adjustable in angle.

5. The in-vehicle video storage device and display device for the motorcycle according to claim 1, wherein the second camera is provided to be near to a center in a vehicle width direction of a stay provided to a head pipe and proximate to a headlight for lighting a front side of the vehicle, and a front surface of the second camera is located behind the headlight.

6. The in-vehicle video storage device and display device for the motorcycle according to claim 5, wherein the second camera is fixed to the stay through a vibration absorber.

7. The in-vehicle video storage device and display device for the motorcycle according to claim 1, wherein the vehicle information contains a slip ratio of TCS (traction control system).

8. The in-vehicle video storage device and display device for the motorcycle according to claim 1, wherein the second camera is disposed below a second light that is turned on at a high beam and that is disposed at a diagonally upper side of a first light that is turned on at the high beam and a low beam.

9. The in-vehicle video storage device and display device for the motorcycle according to claim 8, wherein the first camera and the second camera is disposed behind a wind screen that covers a meter group disposed in front of a handle from a front side.

10. The in-vehicle video storage device and display device for the motorcycle according to claim 8, wherein the second camera is provided to be near to a center in a vehicle width direction of a stay provided to a head pipe and proximate to a headlight for lighting a front side of the vehicle, and a front surface of the second camera is located behind the headlight.

11. The in-vehicle video storage device and display device for the motorcycle according to claim 1, wherein the first camera is disposed on the upper surface of the main trip meter and at a side of an information meter displaying a residual amount of fuel and mode of traction control system (TCS).

12. The in-vehicle video storage device and display device for the motorcycle according to claim 1, including a transmitter for transmitting information of the associated stored video of the first camera and the stored vehicle environmental information to other servers.

* * * * *